April 28, 1959  E. KROLL  2,883,816
APPARATUS FOR AUTOMATICALLY PLACING ARTICLES
IN LAYERS IN CONTAINERS PARTICULARLY
FISH IN BARRELS
Filed May 24, 1957  2 Sheets-Sheet 1

INVENTOR:
E. Kroll
By Lowry & Rinehart
ATTYS.

April 28, 1959

E. KROLL 2,883,816

APPARATUS FOR AUTOMATICALLY PLACING ARTICLES
IN LAYERS IN CONTAINERS PARTICULARLY
FISH IN BARRELS

Filed May 24, 1957

INVENTOR:

E. Kroll

By Lowry & Rinehart

ATTYS

United States Patent Office 2,883,816
Patented Apr. 28, 1959

2,883,816

APPARATUS FOR AUTOMATICALLY PLACING ARTICLES IN LAYERS IN CONTAINERS PARTICULARLY FISH IN BARRELS

Eberhard Kroll, Hamburg-Altona, Germany

Application May 24, 1957, Serial No. 661,362

5 Claims. (Cl. 53—244)

Hitherto certain articles have been placed in containers by hand. This is particularly true for the placing and preservation of fish and fish pieces in barrels, in which, after a layer of fish has been placed in the container, liquid such as pickle, brine or vinegar, is distributed over each layer by hand.

The object of the invention is to provide an apparatus which considerably improves and accelerates the placing of such articles in layers.

According to the invention, this apparatus is characterized in that at least one spiral-shaped chute is fixed on a vertical shaft adapted to be intermittently rotated and at the same time raised or lowered by rotating and guiding means, and the vertical shaft of the spiral-shaped chute extends substantially in the longitudinal axis of a container placed on a motor-driven turntable and can be introduced in and removed from said container, whereas an adjustable feed chute is arranged at the delivery end of an article feeding conveyor means and extends tangentially to the spiral-shaped chute which it may partly overlap.

At the lower end of the spiral-shaped chute a switch contact is provided which is actuated by the articles placed in the container when they have reached a predetermined height and which controls intermittently the rotation and the raising of the spiral-shaped chute through the intermediary of a driving motor. The driving motor may effect the raising and lowering of the spiral-shaped chute, for example, through the intermediary of a cable line, while the rotation of the spiral-shaped chute may be effected during the lifting thereof by means of one or several helical grooves and stationary guide pins engaging therein. However, in a preferred form of construction here described, the arrangement for raising each spiral-shaped chute is such that the driving motor effects the rotation of the spiral-shaped chute which is then caused to ascend or descend by helical guide grooves in the shaft and pins engaging therein. The shaft carrying the spiral-shaped chute can extend to the lower end thereof. The spiral-shaped chute is then arranged around the shaft and fixedly connected therewith.

The device for feeding the articles is provided with a liquid feeding device. Pickle or the like can then be conducted over the spiral-shaped chute into the container together with the articles to be placed.

The whole arrangement can be mounted on a common frame which may be transportable. According to the size of the frame, one or several container filling apparatus with a similar number of feeding devices may be provided.

A preferred embodiment of the invention is illustrated by way of example in the accompanying drawings. In these drawings.

Figure 1:
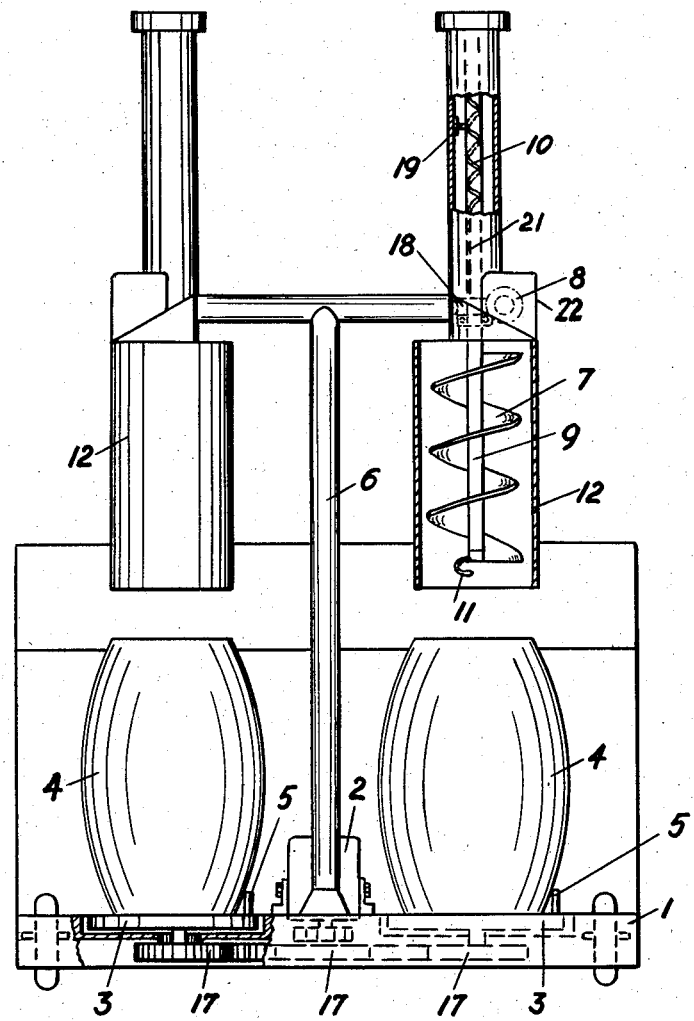
Fig. 1 is a diagrammatic elevational view, partly in section, of a filling apparatus for two containers.
Figure 2:
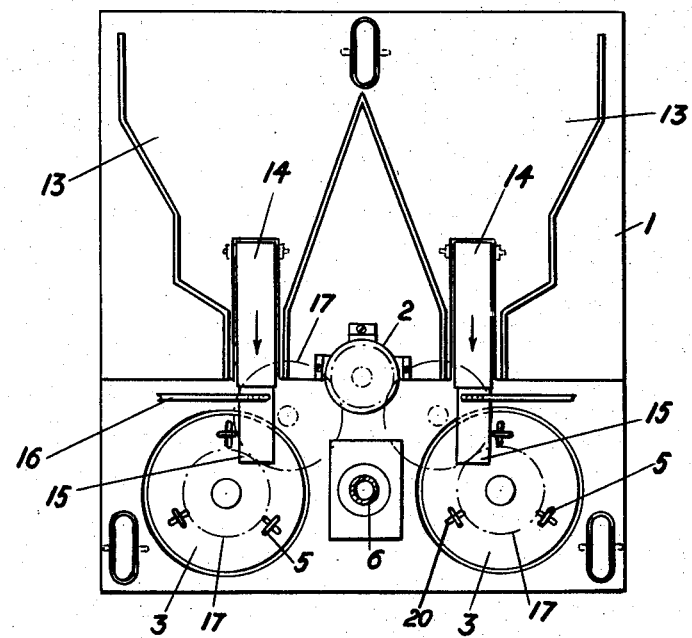
Fig. 2 is a diagrammatic top plan view, parts being omitted.
Figure 3:
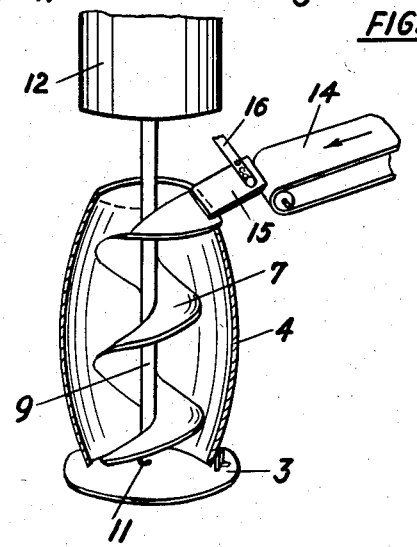
Fig. 3 is a perspective view of a detail of the filling apparatus.

Two turntables 3 driven by a motor 2 through the intermediary of gears 17 are rotatably mounted on a transportable frame 1. A container 4 to be filled is removably placed on each of said turntables 3 and held in position by a number of suitable clamping members 5 each of which is shiftable in a slot 20 extending radially in the turntable 3. On an upright 6 of the frame 1 two filling means are mounted, each of which comprises a spiral-shaped chute 7. The spiral-shaped chute 7 is mounted on a vertical shaft 9 which can be rotated by a drive gear 8 of a motor 22 through the intermediary of a worm gear 18 which is slidable on the shaft 9 by means of a key 21. The upper part of the shaft 9 has in its periphery helical grooves 10 in which stationary guide pins 19 engage so that, as the shaft 9 is rotated, the shaft with the spiral-shaped chute is raised or lowered, respectively. At the lower end of the spiral-shaped chute 7 a switch contact 11 is provided which controls the motor 22 through the intermediary of electric means comprising conduits and a relay. These electric means are known per se and are, therefore, not shown in the drawings. The contact 11 is controlled by the articles placed in the container 4. When the spiral-shaped chute 7 is in raised position it is protected by a surrounding cylindrical jacket or casing 12.

The frame 1 carries work tables 13 which lead to conveyor belts 14. At the end of each conveyor belt 14 an adjustable feed chute 15 is arranged which leads to the associated spiral-shaped chute 7. Above the feed chute there is a feed conduit 16 for supplying liquid if required. This liquid, for example pickle, is fed with the articles to be packed on to the spiral-shaped chute 7 and into the container 4.

The apparatus operates in the following manner:

The articles fed by the conveyor belt 14 pass over the feed chute 15 on to the spiral-shaped chute 7 which is initially in its lowermost position and extends into the lower part of the container 4. The articles thus introduced slide on the spiral-shaped chute to the bottom of the container 4. The container 4 is rotated by the turntable 3 and the charged articles are uniformly distributed in the container by centrifugal forces. As soon as the articles in the container have reached a predetermined height, they actuate the switch contact 11 which switches on the motor 22 which then rotates the shaft 9 with the spiral-shaped chute 7 and raises it through the intermediary of the helical grooves 10 cooperating with the pins 19. After a brief rotary and upward movement of the assembly 9, 7, 11, the motor 22 is automatically switched off by the relay until the following articles reach the switch contact 11. The spiral-shaped chute 7 is then again rotated and raised clear of the goods in the container, this operation being repeated until the container is completely filled. When introducing articles between which, as in the case fo fish for example, pickle must be present, the pickle is supplied by the feed conduit 16 on to the feed chute 15 and the spiral-shaped chute 7 into the container. The pickle is preferably stored in a measuring container, not shown, for supplying the correct quantity for a barrel to be filled. For this purpose it is preferable, though not shown, to provide an overflow pipe which is lowered step-by-step into the measuring container as the spiral-shaped chute 7 is raised step-by-step, so that the liquid running out of the conduit 16 can be adjusted to the height of the goods in the barrel.

From the above detailed description of the invention, it is believed that the construction will at once be apparent, and while there is herein shown and described a preferred embodiment of the invention, it is nevertheless to be understood that minor changes may be made therein without departing from the spirit and scope of the invention as claimed.

I claim:

1. An apparatus for automatically placing fish or fish pieces and the like in layers in a container comprising in combination a spiral-shaped chute means mounted on a vertical adjustable shaft, rotatable support means for a container arranged below said chute means, the axis of rotation of said support means for the container being aligned with the axis of said vertical shaft, means for intermittently rotating and simultaneously adjusting said chute means and shaft with respect to the support means and the container disposed thereon during the feeding of fish to the said container, and an adjustable fish feed chute disposed tangentially of said spiral-shaped chute means and arranged with one of its ends in overlapping relationship therewith.

2. An apparatus as set forth in claim 1, wherein said means for intermittently rotating and adjusting said chute means and shaft with respect to the support means and the container disposed thereon includes a control means actuated upon contact with the contents of the container when the contents reach a predetermined level in the container.

3. An apparatus as set forth in claim 1, wherein said means for intermittently rotating and adjusting said chute means and shaft with respect to the support means and the container disposed thereon includes at least one helical groove in the vertical shaft and at least one guide pin disposed therein.

4. An apparatus for automatically depositing layers of fish and a pickling solution in a container comprising in combination a vertically adjustable spiral-shaped chute means, rotatable container support means arranged below said chute means, the axis of rotation of said support means being aligned with the axis of said chute means, means for intermittently rotating and simultaneously adjusting said chute means with respect to the said support means and the interior of an open-topped container disposed thereon, and an adjustable means disposed tangentially of said spiral-shaped chute means and in partial overlapping relation therewith for simultaneously feeding both fish and the pickling solution to the chute means and the interior of the container.

5. An apparatus as set forth in claim 4, wherein said means for intermittently rotating and adjusting said chute means includes a control means actuated upon contact with the contents of the container when the said contents have reached a predetermined level in the container.

References Cited in the file of this patent

UNITED STATES PATENTS

| | | |
|---|---|---|
| 1,180,773 | Hirschman | Apr. 25, 1916 |
| 1,968,071 | Craine | July 31, 1934 |
| 2,546,501 | Hamilton | Mar. 27, 1951 |

FOREIGN PATENTS

| | | |
|---|---|---|
| 142,403 | Germany | June 19, 1903 |
| 459,899 | Great Britain | Jan. 18, 1937 |